(12) United States Patent
Rosenberg

(10) Patent No.: US 9,360,937 B2
(45) Date of Patent: Jun. 7, 2016

(54) HANDHELD DEVICES USING TACTILE FEEDBACK TO DELIVER SILENT STATUS INFORMATION

(75) Inventor: Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 954 days.

(21) Appl. No.: 11/927,060

(22) Filed: Oct. 29, 2007

(65) Prior Publication Data

US 2010/0325931 A1    Dec. 30, 2010

Related U.S. Application Data

(62) Division of application No. 10/279,302, filed on Oct. 23, 2002, now Pat. No. 7,567,232.

(60) Provisional application No. 60/345,129, filed on Oct. 23, 2001.

(51) Int. Cl.
| | |
|---|---|
| *G06F 3/01* | (2006.01) |
| *F41A 17/06* | (2006.01) |
| *F41B 15/04* | (2006.01) |
| *F41H 13/00* | (2006.01) |
| *H04M 19/04* | (2006.01) |

(52) U.S. Cl.
CPC ............... *G06F 3/016* (2013.01); *F41A 17/06* (2013.01); *F41B 15/04* (2013.01); *F41H 13/0012* (2013.01); *F41H 13/0018* (2013.01); *H04M 19/04* (2013.01); *G06F 2203/014* (2013.01); *H04M 19/047* (2013.01)

(58) Field of Classification Search
CPC ..... F41A 17/06; F41B 15/04; F41H 13/0012; F41H 13/0018; G06F 2203/014; G06F 3/016; H04M 19/04; H04M 19/047; F16D 41/02; F16D 41/064
USPC ......... 345/156, 161, 163, 166, 168, 173, 175, 345/179; 463/30–39; 715/701, 702; 200/512–522

See application file for complete search history.

(56) References Cited

U.S. PATENT DOCUMENTS

| | | |
|---|---|---|
| 3,157,853 A | 11/1964 | Hirsch |
| 3,220,121 A | 11/1965 | Cutler |

(Continued)

FOREIGN PATENT DOCUMENTS

| | | |
|---|---|---|
| CN | 1222846 | 7/1999 |
| DE | 196 38 015 A1 | 3/1998 |

(Continued)

OTHER PUBLICATIONS

Examiner's Comments from the Japanese Patent Office dated Apr. 13, 2010 for corresponding Japanese Application No. 2003-555488.

(Continued)

*Primary Examiner* — Dmitriy Bolotin
(74) *Attorney, Agent, or Firm* — Kilpatrick Townsend & Stockton LLP

(57) ABSTRACT

Handheld weapons using tactile feedback to deliver silent status information are described. One embodiment comprises a handheld weapon comprising: a housing comprising a user contactable region, a tactile element coupled to the user contactable region, and an actuator coupled to the tactile element and capable of outputting a haptic sensation localized to the tactile element.

19 Claims, 4 Drawing Sheets

(56) References Cited

U.S. PATENT DOCUMENTS

| | | | |
|---|---|---|---|
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 4,160,508 A | 7/1979 | Salisbury | |
| 4,236,325 A | 12/1980 | Hall et al. | |
| 4,391,282 A | 7/1983 | Ando | |
| 4,513,235 A | 4/1985 | Acklam et al. | |
| 4,581,491 A | 4/1986 | Boothroyd | |
| 4,599,070 A | 7/1986 | Hladky et al. | |
| 4,708,656 A | 11/1987 | De Vries et al. | |
| 4,713,007 A | 12/1987 | Alban | |
| 4,791,416 A | 12/1988 | Adler | |
| 4,795,296 A | 1/1989 | Jau | |
| 4,798,919 A | 1/1989 | Miessler et al. | |
| 4,821,030 A | 4/1989 | Batson | |
| 4,885,565 A | 12/1989 | Embach | |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,078,152 A | 1/1992 | Bond | |
| 5,182,557 A | 1/1993 | Lang | |
| 5,186,695 A | 2/1993 | Mangseth et al. | |
| 5,212,473 A | 5/1993 | Louis | |
| 5,223,658 A | 6/1993 | Suzuki | |
| 5,237,327 A | 8/1993 | Saitoh et al. | |
| 5,240,417 A | 8/1993 | Smithson et al. | |
| 5,242,278 A | 9/1993 | Vanderslice et al. | |
| 5,271,290 A | 12/1993 | Fischer | |
| 5,275,174 A | 1/1994 | Cook | |
| 5,299,810 A | 4/1994 | Pierce | |
| 5,303,495 A | 4/1994 | Harthcock | |
| 5,309,140 A | 5/1994 | Everett | |
| 5,334,027 A | 8/1994 | Wherlock | |
| 5,355,148 A | 10/1994 | Anderson | |
| 5,390,128 A | 2/1995 | Ryan et al. | |
| 5,390,296 A | 2/1995 | Crandall et al. | |
| 5,402,499 A | 3/1995 | Robison et al. | |
| 5,436,622 A | 7/1995 | Gutman et al. | |
| 5,451,924 A | 9/1995 | Massimino et al. | |
| 5,461,711 A | 10/1995 | Wang et al. | |
| 5,466,213 A | 11/1995 | Hogan | |
| 5,502,915 A * | 4/1996 | Mendelsohn et al. | 42/70.11 |
| 5,510,589 A * | 4/1996 | Arnal | 200/522 |
| 5,515,738 A | 5/1996 | Tamori | |
| 5,524,195 A | 6/1996 | Clanton, III et al. | |
| 5,546,471 A | 8/1996 | Merjanian | |
| 5,547,382 A | 8/1996 | Yamasaki | |
| 5,565,840 A | 10/1996 | Thorner et al. | |
| 5,631,861 A | 5/1997 | Kramer | |
| 5,669,818 A | 9/1997 | Thorner et al. | |
| 5,684,722 A | 11/1997 | Thorner et al. | |
| 5,691,747 A | 11/1997 | Amano | |
| 5,709,219 A | 1/1998 | Chen et al. | |
| 5,724,106 A | 3/1998 | Autry et al. | |
| 5,729,249 A | 3/1998 | Yasutake | |
| 5,742,278 A * | 4/1998 | Chen et al. | 345/156 |
| 5,766,016 A | 6/1998 | Sinclair | |
| 5,767,457 A | 6/1998 | Gerpheide et al. | |
| 5,785,630 A | 7/1998 | Bobick et al. | |
| 5,790,108 A * | 8/1998 | Salcudean et al. | 345/184 |
| 5,812,252 A * | 9/1998 | Bowker et al. | 356/71 |
| 5,826,360 A * | 10/1998 | Herold et al. | 42/1.02 |
| 5,857,986 A | 1/1999 | Moriyasu | |
| 5,887,995 A | 3/1999 | Holehan | |
| 5,889,506 A | 3/1999 | Lopresti et al. | |
| 5,889,670 A | 3/1999 | Schuler et al. | |
| 5,889,672 A | 3/1999 | Schuler et al. | |
| 5,945,772 A * | 8/1999 | Macnak et al. | 310/326 |
| 5,982,612 A | 11/1999 | Roylance | |
| 5,988,902 A | 11/1999 | Holehan | |
| 6,059,506 A | 5/2000 | Kramer | |
| 6,067,081 A | 5/2000 | Hahlganss et al. | |
| 6,078,126 A * | 6/2000 | Rollins et al. | 310/330 |
| 6,097,964 A | 8/2000 | Nuovo et al. | |
| 6,111,577 A | 8/2000 | Ailles et al. | |
| 6,128,006 A | 10/2000 | Rosenberg et al. | |
| 6,131,097 A | 10/2000 | Perach et al. | |
| 6,147,674 A | 11/2000 | Rosenberg et al. | |
| 6,160,489 A | 12/2000 | Perry et al. | |
| 6,195,592 B1 | 2/2001 | Schuler et al. | |
| 6,198,206 B1 | 3/2001 | Saarmaa et al. | |
| 6,218,966 B1 | 4/2001 | Goodwin et al. | |
| 6,219,034 B1 | 4/2001 | Elbing et al. | |
| 6,225,976 B1 | 5/2001 | Yates et al. | |
| 6,374,255 B1 | 4/2002 | Peurach et al. | |
| 6,422,941 B1 | 7/2002 | Peurach et al. | |
| 6,429,846 B2 | 8/2002 | Rosenberg et al. | |
| 6,448,977 B1 | 9/2002 | Braun et al. | |
| 6,509,892 B1 | 1/2003 | Cooper et al. | |
| 6,563,487 B2 | 5/2003 | Martin et al. | |
| 6,600,938 B1 | 7/2003 | Suzuki | |
| 6,859,196 B2 | 2/2005 | Kehlstadt | |
| 6,967,643 B2 * | 11/2005 | Tichy et al. | 345/157 |
| 2001/0005108 A1 * | 6/2001 | Saarmaa et al. | 310/345 |
| 2001/0008355 A1 | 7/2001 | Gokturk et al. | |
| 2001/0019071 A1 | 9/2001 | Vor Keller et al. | |
| 2001/0026264 A1 | 10/2001 | Rosenberg | |
| 2002/0033795 A1 * | 3/2002 | Shahoian et al. | 345/156 |
| 2002/0054060 A1 | 5/2002 | Schena | |
| 2002/0128048 A1 | 9/2002 | Aaltonen et al. | |
| 2002/0177471 A1 | 11/2002 | Kaaresoja et al. | |
| 2003/0048037 A1 * | 3/2003 | Boyd | 310/318 |
| 2004/0216348 A1 * | 11/2004 | McMoore | 42/70.07 |
| 2006/0092177 A1 * | 5/2006 | Blasko | 345/619 |

FOREIGN PATENT DOCUMENTS

| | | |
|---|---|---|
| DE | 19638015 | 3/1998 |
| EP | 0349086 | 1/1990 |
| JP | H2-185278 | 7/1990 |
| JP | 3-63054 | 3/1991 |
| JP | H4-8381 | 1/1992 |
| JP | H5-192449 | 8/1993 |
| JP | 6-22518 | 3/1994 |
| JP | H7-24147 | 1/1995 |
| JP | 7-253846 | 10/1995 |
| JP | H7-253846 | 10/1995 |
| JP | H09-026850 | 1/1997 |
| JP | 9-090867 | 4/1997 |
| JP | 9-167541 | 5/1997 |
| JP | 9-167541 | 6/1997 |
| JP | 9-248213 | 9/1997 |
| JP | 11-212725 | 8/1999 |
| KR | 2000-77299 | 12/2000 |
| WO | WO 95/20787 | 8/1995 |
| WO | WO 97/18546 A1 | 5/1997 |
| WO | 98/51255 | 11/1998 |
| WO | 99/66997 | 12/1999 |
| WO | WO 99/66997 | 12/1999 |
| WO | WO 01/13354 A1 | 2/2001 |
| WO | WO 01/91100 A1 | 11/2001 |
| WO | WO 02/31807 A1 | 4/2002 |

OTHER PUBLICATIONS

Office Action mailed Sep. 9, 2010 for corresponding U.S. Appl. No. 11/926,980.

United States Patent and Trademark Office, Office Action, U.S. Appl. No. 10/279,302, mailed Oct. 1, 2004.

United States Patent and Trademark Office, Office Action, U.S. Appl. No. 10/279,302, mailed Jun. 21, 2006.

United States Patent and Trademark Office, Office Action, U.S. Appl. No. 10/279,302, mailed Jan. 16, 2007.

United States Patent and Trademark Office, Office Action, U.S. Appl. No. 10/279,302, mailed May 31, 2007.

United States Patent and Trademark Office, Office Action, U.S. Appl. No. 10/279,302, mailed Sep. 13, 2007.

(56) References Cited

OTHER PUBLICATIONS

United States Patent and Trademark Office, Office Action, U.S. Appl. No. 10/279,302, mailed Feb. 27, 2008.
United States Patent and Trademark Office, Office Action, U.S. Appl. No. 10/279,302, mailed Sep. 5, 2008.
Examination Report mailed Mar. 20, 2009 corresponding to European Patent Application No. 02782221.2.
Fourth Office Action mailed Jul. 1, 2008 corresponding to Chinese Patent Application No. 02820624.X.
Official Notice of Rejection mailed Sep. 26, 2008 corresponding to Chinese Patent Application No. 02820624.X.
Preliminary Rejection mailed Nov. 2, 2009 corresponding to Korean Patent Application No. 10-2009-7014313.
Baigrie, "Electric Control Loading—A Low Cost, High Performance Alternative," Proceedings, pp. 247-254, Nov. 6-8, 1990.
Iwata, "Pen-based Haptic Virtual Environment," 0-7803-1363-1/93 IEEE, pp. 287-292, 1993.
Russo, "The Design and Implementation of a Three Degree of Freedom Force Output Joystick," MIT Libraries Archives Aug. 14, 1990, pp. 1-131, May 1990.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Jones et al., "A perceptual analysis of stiffness," ISSN 0014-4819 Springer International (Springer-Vertag); Experimental Brain Research, vol. 79, No. 1, pp. 150-156, 1990.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Snow et al., "Model-X Force-Reflecting-Hand-Controller," NT Control No. MPO-17851; JPL Case No. 5348, pp. 1-4, Jun. 15, 1989.
Ouh-Young, "Force Display in Molecular Docking," Order No. 9034744, p. 1-369, 1990.
Tadros, Control System Design for a Three Degree of Freedom Virtual Environment Simulator Using Motor/Brake Pair Actuators, MIT Archive© Massachusetts Institute of Technology, pp. 1-88, Feb. 1990.
Caldwell et al., "Enhanced Tactile Feedback (Tele-Traction) Using a Multi-Functional Sensory System," 1050-4729/93, pp. 955-960, 1993.
Adelstein, "Design and Implementation of a Force Reflecting Manipulandum for Manual Control research," DSC—vol. 42, Advances in Robotics, Edited by H. Kazerooni, pp. 1-12, 1992.
Gotow et al, "Controlled Impedance Test Apparatus for Studying Human Interpretation of Kinesthetic Feedback," WA11-11:00, pp. 332-337.
Stanley et al., "Computer Simulation of Interacting Dynamic Mechanical Systems Using Distributed Memory Parallel Processors," DSV—vol. 42, Advances in Robotics, pp. 55-61, ASME 1992.
Russo, "Controlling Dissipative Magnetic Particle Brakes in Force Reflective Devices," DSC—vol. 42, Advances in Robotics, pp. 63-70, ASME 1992.
Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.
Adelstein, "A Virtual Environment System for the Study of Human Arm Tremor," Ph.D. Dissertation, Dept. of Mechanical Engineering, MIT, Jun. 1989.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings of Fourth CISM-IFToMM, Sep. 8-12, 1981.

McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.
Minsky, "Computational Haptics: The Sandpaper System for Synthesizing Textue for a Force-Feedback Display," Ph.D. Dissertation, MIT, Jun. 1995.
Jacobsen et al., "High Performance, Dextrous Telerobotic Manipulator With Force Reflection," Intervention/ROV '91 Conference & Exposition, Hollywood, Florida, May 21-23, 1991.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
IBM Technical Disclosure Bullein, "Mouse Ball-Actuating Device With Force and Tactile Feedback," vol. 32, No. 9B, Feb. 1990.
Terry et al., "Tactile Feedback in a Computer Mouse," Proceedings of Fourteenth Annual Northeast Bioengineering Conference, University of New Hampshire, Mar. 10-11, 1988.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
Eberhardt et al., "OMAR—A Haptic display for speech perception by deaf and def-blind individuals," IEEE Virtual Reality Annual International Symposium, Seattle, WA, Sep. 18-22, 1993.
Rabinowitz et al., "Multidimensional tactile displays: Identification of vibratory intensity, frequency, and contractor area," Journal of The Accoustical Society of America, vol. 82, No. 4, Oct. 1987.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy et al., "A Laboratory Breadboard System for Dual-Arm Teleoperation," SOAR '89 Workshop, JSC, Houston, TX, Jul. 25-27, 1989.
Ouh-Young, "A Low-Cost Force Feedback Joystick and Its Use in PC Video Games," IEEE Transactions on Consumer Electronics, vol. 41, No. 3, Aug. 1995.
Marcus, "Touch Feedback in Surgery," Proceedings of Virtual Reality and Medicine The Cutting Edge, Sep. 8-11, 1994.
Bejczy, et al., "Universal Computer Control System (UCCS) for Space Telerobots," CH2413-3/87/0000/0318501.00 1987 IEEE, 1987.
Aukstakalnis et al., "Silicon Mirage: The Art and Science of Virtual Reality," ISBN 0-938151-82-7, pp. 129-180, 1992.
Eberhardt et al., "Including Dynamic Haptic Perception by The Hand: System Description and Some Results," DSC—vol. 55-1, Dynamic Systems and Control: vol. 1, ASME 1994.
Gobel et al., "Tactile Feedback Applied to Computer Mice," International Journal of Human-Computer Interaction, vol. 7, No. 1, pp. 1-24, 1995.
Pimentel et al., "Virtual Reality: through the new looking glass," $2_{nd}$ Edition; McGraw-Hill, ISBN 0-07-050167-X, pp. 41-202, 1994.
"Cyberman Technical Specification," Logitech Cyberman SWIFT Supplement, Apr. 5, 1994.
Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.
Scannell, "Taking a Joystick Ride", Computer Currents, Nov. 1994, Boston Edition, vol. 9 No. 11.
International Search Report mailed Jan. 31, 2003 corresponding to PCT/US02/34019.
European Patent Office, Supplemental European Search Report, Application No. EP 0 278 2221, mailed Jun. 13, 2007.
Patent Office of the Peoples Republic of China, First Office Action, Application No. 02820624.X, mailed Dec. 15, 2006.
Patent Office of the Peoples Republic of China, Secondt Office Action, Application No. 02820624.X, mailed Aug. 3, 2007.
Patent Office of the Peoples Republic of China, Third Office Action, Application No. 02820624.X, mailed Jan. 25, 2008.

(56) References Cited

OTHER PUBLICATIONS

European Patent Office, Communication pursuant to Article 96(2) EPC, Application No. 02782221.2, mailed Oct. 11, 2007.
Kaczmarek et al., Tactile Displays, Virtual Environment Technologies; 1995.
Office Action Summary mailed Feb. 14, 2011, for copending U.S. Appl. No. 11/926,980.
United States Patent and Trademark Office, Office Action, U.S. Appl. No. 11/927,060, mailed Jun. 4, 2012.
United States Patent and Trademark Office, Office Action, U.S. Appl. No. 11/927,060, mailed Apr. 18, 2011.
United States Patent and Trademark Office, Office Action, U.S. Appl. No. 11/926,980, mailed Mar. 4, 2013.
United States Patent and Trademark Office, Office Action, U.S. Appl. No. 11/926,980, mailed Jul. 11, 2013.
United States Patent and Trademark Office, Office Action, U.S. Appl. No. 11/927,060, mailed Nov. 29, 2011.
United States Patent and Trademark Office, Office Action, U.S. Appl. No. 11/927,060, mailed Nov. 17, 2015.
United States Patent and Trademark Office, Office Action, U.S. Appl. No. 11/927,060, mailed Jul. 28, 2011.
United States Patent and Trademark Office, Office Action, U.S. Appl. No. 11/927,060, mailed Nov. 15, 2010.

* cited by examiner

HANDHELD DEVICES USING TACTILE FEEDBACK TO DELIVER SILENT STATUS INFORMATION

CROSS-REFERENCES TO RELATED APPLICATIONS

This application is a divisional application of U.S. patent application No. 10/279,302 filed Oct. 23, 2002, entitled "Method of Using Tactile Feedback to Deliver Silent Status Information to a User of an Electronic Device," now U.S. Patent No. 7,567,232, which claims priority to U.S. Provisional Patent Application S.N. 60/345,129, filed Oct. 23, 2001, the entire disclosure of each of which is incorporated herein by reference.

The present application is also related to U.S. Provisional Application No. 60/274,444, filed Mar. 9, 2001 and U.S. Non-provisional Application No. 09/917,263, Jul. 26, 2001, now U.S. Patent No. 6,822,635, the complete disclosures of which are incorporated herein by reference.

BACKGROUND OF THE INVENTION

The present invention relates generally to haptic feedback provided to a user operating electronic devices.

Humans interface with and operate electronic and mechanical devices in a variety of applications, and the need for a more natural, easy-to-use, and informative interface is a constant concern. One such application is interacting with computer-generated environments such as application programs using devices such as mice, trackballs, joysticks, steering wheels, etc. In other applications, the user operates electronic devices in a variety of tasks, from sensing desired objects or information, controlling device functions remotely, etc.

Some devices deliver needed information to the user during their operation. For example, a metal detector can be used to detect hidden metal objects in the ground, in other objects, etc. Typically, when the sensors of the device detect metal, an audible and/or visual cue is provided to the user, such as a beep sound or a blinking light. Other devices similarly provide audible or visual cues to the user to inform the user of the status or operation of the device, such as bar scanners detecting bar code prices on products purchased in a store, remote controls that have remotely turned off an intruder alarm and/or locked or unlocked doors of a vehicle, etc. Some devices, such as pagers and some cellular telephones, may convey cues tactilely, such as through a vibration, in which the entire housing of the pager or cellular telephone is vibrated and the user contacting the housing of the electronic device feels the vibration.

The conventional devices, however, typically do not convey their haptic cues privately, so that only the user of the device is delivered these cues. For example, a bar scanner or metal detector typically delivers a loud beep or other haptic cue which other people in the vicinity besides the user can also hear. Vibration elements within standard pagers and cellular telephones often use inertial masses that shake violently to vibrate the entire device. Unfortunately, most of those mechanisms create residual noise that can be heard by other people in close proximity.

These publicly-sensed cues can be a disadvantage in many situations. For example, a clerk in a store who is using a barcode scanner wants to hear only his or her own barcode scanner, not the barcode scanners of other clerks; otherwise it may be confusing as to whether the clerk's own barcode scanner has detected a barcode. For metal detectors, it may be undesirable to have others be aware that metal has been detected, e.g. in a security checkpoint in an airport where luggage is being scanned for weapons. For remote controls, a person may not want others to hear that he or she has just turned off/on a car alarm or locked/unlocked a car door. Therefore, a more private way of conveying such haptic cues is needed.

BRIEF SUMMARY OF THE INVENTION

Embodiments of the present invention may deliver haptic cues to users in environments and situations where sight and/or sound is too overt from a privacy perspective. Unlike audio cues or visual cues, the haptic cues of the embodiments of the present invention can be discretely delivered to a user contacting the electronic device, without the haptic cues being overheard, seen, or otherwise sensed by others.

Embodiments of the present invention provide systems, devices and method of delivering a localized haptic feedback to a user. One embodiment of the present invention provides a housing and a tactile element coupled to a region of the housing that is contacted by a user during operation of the electronic device. An actuator may be coupled to the tactile element and can discretely output a localized haptic sensation to the tactile element and the user contacting the tactile element.

A further understanding of the nature and advantages of the invention will become apparent by reference to the remaining portions of the specification and drawings.

DETAILED DESCRIPTION OF THE INVENTION

Figure 1:
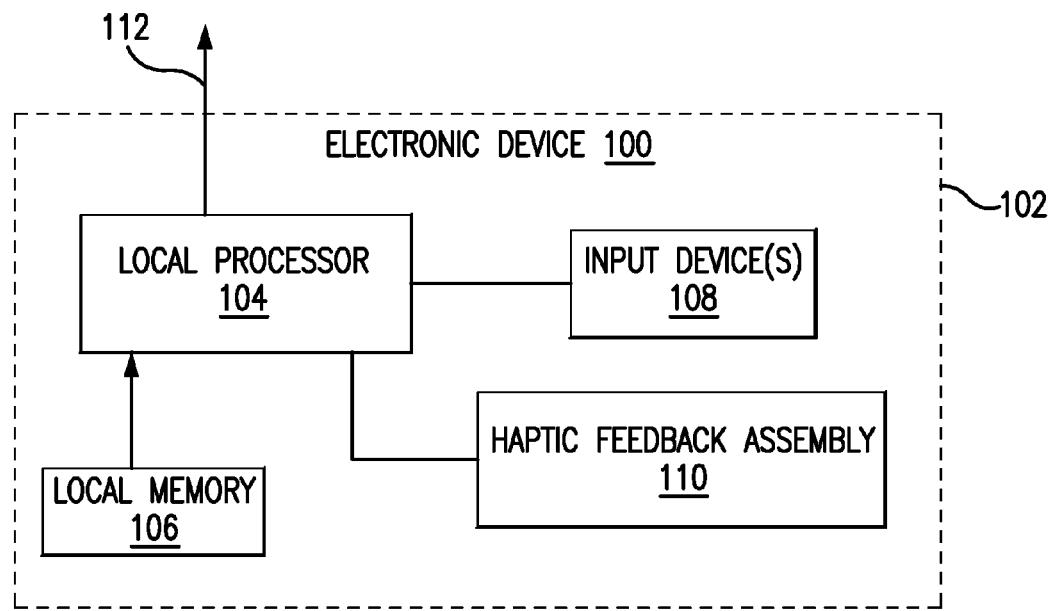
FIG. 1 is a block diagram that illustrates a device of one embodiment of the present invention.

FIG. 1 is a block diagram illustrating an electronic device 100 suitable for use with embodiments of the present invention. Electronic device 100 includes a housing 102 that can carry a local processor 104 and a memory 106. Local processor 104 may be operatively coupled to one or more input devices 108. A haptic feedback assembly, illustrated schematically at 110, can be coupled to local processor 104 and can be configured to deliver a localized haptic sensation to a user that is contacting the haptic feedback assembly 110. In embodiments, where electronic device 100 is configured to be used with a host computer system (not shown), local processor 102 may communicate with the host computer system in any way known in the art to enable data transfer between the host computer system and electronic device, either uni-directional, bi-direction, or both.

While not illustrated, electronic device 100 may also include other well known components, such as, but not limited to, a display device, a system clock, an audio output device, a bus, random access memory (RAM), read-only memory (ROM), and input/output (VO) electronics (not shown), or the like.

In some embodiments, input devices 108 of the electronic device can also be configured to produce haptic sensations. This can allow the electronic device to transmit two different tactile sensations simultaneously to the user. For example, a vibration of a low frequency can be conveyed through a tactile element of the haptic assembly to the user and a higher frequency vibration can be conveyed to the user through the input device, or vice-versa.

Figure 2:
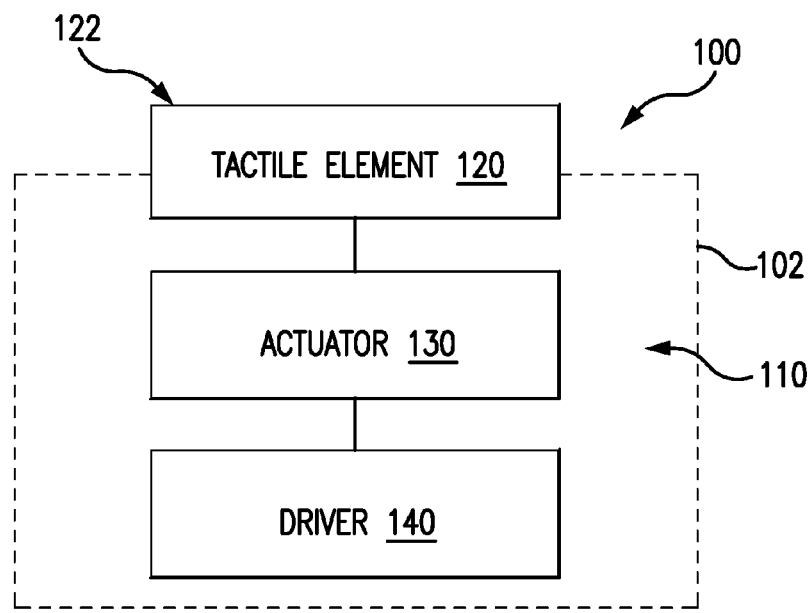
FIG. 2 is a block diagram that illustrates a haptic feedback assembly of one embodiment of the present invention.

FIG. 2 is a block diagram that schematically illustrates an embodiment of haptic feedback assembly 110 that can be carried by housing 102 of the electronic device to deliver a localized haptic sensation to a user. Haptic feedback assembly 110 typically includes a tactile element 120 and an actuator 130. Tactile element 120 can include a contact surface 122 coupled to a surface of housing 102 that can be actuated by a periodic driving signal from a driving mechanism 140 that imparts very small motions that are felt by the user, typically as vibrations or impulses. Contact surface 122 may be substantially planar, curved, textured, or the like.

In one embodiment, tactile element 120 is located in a region of housing 102 where a user will engage electronic device 100, such as a handle, grip, stylus, trigger, or the like. For example, tactile element 120 can be positioned so as to contact the user's finger, hand, or other appendage or skin surface (directly or indirectly, e.g. through clothing, an object, etc.) during normal operation of the electronic device. By placing tactile element 120 in functional relation to a part of the user's body that is sensitive (such as a finger or palm), only a local area of electronic device 100 needs to be actuated to convey the haptic sensation to the user.

Actuator 130 can be coupled to tactile element 120 to output the localized haptic feedback to the tactile element 120. Actuator 130 generally delivers haptic sensations only to tactile element 120 and does not have to deliver haptic sensations (e.g., vibrations) to the entire electronic device held or contacted by the user. Therefore, haptic feedback assembly 110 is less likely to create residual noise that will be sensed by surrounding people. Such a configuration further allows for a very low power solution that is better for handheld electronic devices that often run on battery power.

In some embodiments, actuator 130 is a solid-state element so as to provide solid-state haptic stimulation without using overtly moving parts that create residual noise that can be overhead by people in the vicinity.

Embodiments of the actuator 130 encompass both inertial haptic feedback and moving contact haptic feedback. Inertial feedback can be generated using inertially coupled vibrations and is based on moving an inertial mass, where the mass motions cause inertial vibrations in a tactile element contacted by the user. Moving contact feedback relates to directly moving a surface of the tactile member, with respect to an earth ground, against the user and usually is generated by creating small displacements of the user's skin.

Driving mechanism 140 can be coupled to the actuator 130 to generate the drive signals to control the delivery of the haptic feedback output to the user that contacts tactile element 120. Driving mechanism 140 can include, but are not limited to, local processor 104, a different processor, ASIC electronics, and other electronic controllers that can provide the drive signals to the actuator to output haptic sensations. Additional electronic components (amplifiers, op amps, etc.) can be used to convert the signals to a form needed for the actuator, if needed. Some embodiments may also include a dedicated sensor 501 (e.g. an optical detector) that can detect when a user is contacting the device in such a manner as to feel the haptic sensations output by the contact element, e.g. a sensor 121 in the contact element can detect user contact with the element. Haptic sensations then need be output only if user contact is detected, potentially saving battery power in appropriate embodiments.

Haptic feedback assembly 110 can be implemented in a variety of ways. For example, tactile element 120 contacting the user can be driven using a variety of types of actuators 130 including, but not limited to, piezoelectric ceramic actuators, voice coils, moving magnet actuators, solenoids, electro-active polymers molded into the housing, or other actuators.

Some embodiments of the haptic sensations are based on displacing the skin of a user's finger or palm when it is in contact with the tactile element. Other embodiments are based on the stimulation of the user's finger or palm surfaces that are normally in contact with the electronic device. The tactile elements can provide haptic sensations based on inertially coupled forces or translation of the finger or palm surfaces. Translations of surfaces in plane with the contact surface of the tactile element (i.e. in the X and/or Y axes) are as effective at conveying haptic information as vibrations or displacements in the Z axis (those normal to the contact surface of the tactile element). This can be important when the volumetric constraints of the electronic device are considered.

In some of the embodiments, actuator 130 can be configured to apply a short duration force sensation on the tactile element 120 of the electronic device. This short duration force sensation can be described as a "pulse." The "pulse" can be directed substantially along a particular direction. In some embodiments, the magnitude of the "pulse" can be controlled; the sense of the "pulse" can be controlled, either positive or negative biased; a "periodic force sensation" can be applied and can have a magnitude and a frequency, e.g. the periodic sensation can be selectable among a sine wave, square wave, saw-toothed-up wave, saw-toothed-down, and triangle wave; an envelope can be applied to the period signal, allowing for variation in magnitude over time. The waveforms can be "streamed," or can be conveyed through high level commands that include parameters such as magnitude, frequency, and duration.

In many of the embodiments described herein, it may also be advantageous that contact of the user is detected by a tactile element device. Since haptic feedback need only be output when the user is contacting the tactile element, this detection allows haptic feedback to be stopped (actuators "turned off") when no objects are contacting the tactile element. This feature can conserve battery power for the electronic device. If a local processor (or similar circuitry) is being used in the electronic device, such a processor can turn off the actuator when no user contact is sensed, thus alleviating the processor of additional computational burden until touch is again detected.

Figure 3:
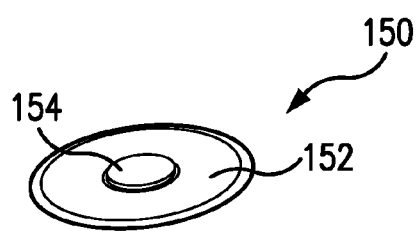
FIG. 3 is a simplified perspective view of one embodiment of an actuator.
Figure 4:
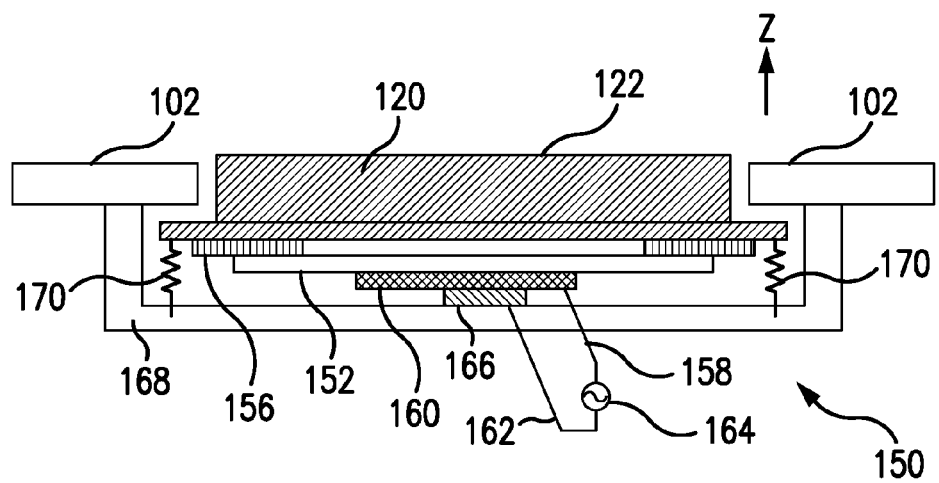
FIG. 4 is a side elevational view of an actuator that provides haptic feedback.

FIGS. 3 and 4 illustrate embodiments of an actuator that can be used to actuate the tactile element. In the illustrated embodiment, a high frequency mechanical oscillator, mechanically coupled to tactile element 120, is modulated so as to oscillate contact surface 122 that is to be contacted by the user. One example of such an implementation may include a large-diameter commercially available thin piezoelectric transducer 150, (e.g., 60 mm in diameter with natural frequencies of 300 to 400 Hz when supported peripherally). Piezoelectric transducer 150 can include a thin metal diaphragm 152. Large diameter piezoelectric driving mechanisms are available, for example, from Kingstate of Taiwan. As can be appreciated, differently sized piezoelectric diaphragms can also be used.

One embodiment may include an added mass 154 at the center of the piezoelectric diaphragm 152 in order to add inertial mass and lower the natural frequency so as to achieve stronger inertial haptic sensations from the oscillating diaphragm and mass. The outer periphery of piezoelectric transducer 150 can be grounded and the added mass 153 can oscillate orthogonal to the surface of the piezoelectric diaphragm to create haptic sensations on the user contacting the piezoelectric actuator 150 or a tactile element 120 that is coupled to the piezoelectric actuator 150.

Piezoelectric transducer 150 can function as a harmonic oscillator that runs at a relatively high frequency that transmits haptic sensations to the user. Amplitude modulation (envelope control) may be used to produce a wider haptic spectrum than the single fundamental drum mode.

To provide the desired haptic sensations, piezoelectric transducer 150 can provide large sustainable displacements (accelerations) of the added mass 154 and the carrier frequency (the frequency at which it oscillates) can be modulated with a haptic drive signal. Some electronics (not shown) may be needed to operate this type of actuator. A high voltage supply can be generated from 5 volts as required to drive the piezoelectric transducer. An oscillation circuit, e.g., self-exciting, can drive the piezoelectric transducer. There can be a gating feature to start and stop the oscillation of the piezoelectric transducer as well as a proportional control to allow modulation of the amplitude of the haptic output. An all-digital implementation may be provided by gating the oscillator on and off.

FIG. 4 is a side elevational view of one embodiment of the piezoelectric transducer 150 that applies vibrations directly to the contact surface 122 of tactile element 120 that is functionally disposed against a user's palm or finger when the user is manually engaging the electronic device. The contact surface 122 can have a smooth surface, substantially planar surface, curved surface, textured surface, and/or include other features on its surface to enhance user contact. A handle housing 102 may include bezels which keep dirt from getting inside the tactile feedback device.

In the illustrated embodiment, tactile element 120 is surface mounted in a handle or grip portion of housing 102 of the electronic device and operatively coupled to piezoelectric ceramic actuator 150. Tactile element 120 can be fitted with a mass to define a resonance frequency that maximizes the haptic output for the range of haptic sensations desired. In some embodiments, the tactile element 120 can be mounted on a flexible, preloaded suspension that enables vibratory motion when driven by piezoelectric ceramic actuator 150. Tactile element 120 can rest on a spacer 156 having a particular mass chosen to allow for efficient haptic output. The spacer 156 rests on the edge of piezoelectric metal diaphragm 152, which is part of the piezoelectric transducer 150, and where an electrical lead 158 is coupled between the diaphragm 152 and a signal source 164. The piezoelectric ceramic element 160, also part of the piezoelectric transducer 150, can be coupled to the metal diaphragm 152 and an electrical lead 162 can electrically connect the element 160 and the signal source 164. A conductive electrode can be plated on the piezoelectric ceramic element 160 to deliver the driving signal from signal source 164 to the metal diaphragm 152. A contact pad 166 can be positioned between the piezoelectric ceramic element 160 and a bottom housing 168, where contact pad 166 can be rigidly coupled to both piezoelectric ceramic element 160 and bottom housing 168. The contact pad 166 can be made small so that metal diaphragm 152 will have increased bending, resulting in greater acceleration and stronger haptic effects to the user. One or more preloaded spring elements 170 can couple the tactile element 120 to the bottom housing 168. The spring elements 170 can include, but are not limited to, flexible elements, leaf springs, helical springs, etc. Alternatively, a foam pad or similar structure can be used to preload the tactile element.

In operation, piezoelectric transducer 150 can move along the z-axis (which can be oriented in any desired direction with respect to the user's ground) when an oscillating current from signal source 164 is transmitted through metal diaphragm 152 and piezoelectric ceramic element 160. Thus, spacer 156 is typically provided only at the edge of the metal diaphragm 152 to allow the inner portion of the metal diaphragm and the piezoelectric ceramic element 160 to move. Piezoelectric ceramic element 160 can push against the bottom housing 168, causing metal diaphragm 152 to push against spacer 156, which in turn pushes against tactile element 120. This can push tactile element 120 away from bottom housing 168 in the z-direction, and spring elements 170 can provide a spring return force on the contact element so that it will return to its neutral position. When the piezoelectric transducer similarly moves in the opposite direction, as directed by the oscillating signal, this moves tactile element 120 toward bottom housing 168. The contact element thus oscillates along the z-axis and provides haptic sensations to the user contacting tactile element 120.

In some embodiments, the components of the embodiment can be chosen to provide more effective haptic sensations. For example, if piezoelectric transducer 150 oscillates at close to a natural frequency of the mechanical system (including the piezoelectric transducer itself), then stronger forces and more effective haptic sensations can be output. The natural frequency of this moving mechanical system can be approximately expressed as the square root of the expression k1 plus k2 divided by m, as shown below:

$$fn \approx \sqrt{(k1+k2/m)}$$

where fn is the natural frequency, k1 is the spring constant of the metal diaphragm 152 of the piezoelectric transducer 150, k2 is the spring constant of the spring elements 170, and m is the total mass of the spacer 156, the tactile element 120, and the parts of the suspension attached to the tactile element. This mass, as well as the spring constants, can be selected to provide a desirable low natural frequency, such as about 120 Hz or less, which tends to cause effective haptic sensations. In some cases, a frequency between 0 Hz and 500 Hz may be desirable. The spacer 156 can allow multiple piezoelectric transducers, e.g. positioned side by side, to be positioned against the bottom housing 168, so that the multiple transducers can be driven in unison for stronger haptic effects or at different times to provide sensations at particular locations of the tactile element 120.

In an alternate embodiment, the piezoelectric transducer and spacer can be reversed in orientation so that the spacer 156 contacts the bottom housing 168, metal diaphragm 152 rests on the spacer 156, the piezoelectric ceramic element 160 is positioned above the metal diaphragm, and the piezoelectric ceramic element directly impacts the tactile element 120 or a pad coupled to the tactile element when it is oscillated by the driving signal. In yet other embodiments, the piezoelectric ceramic element 160 can be directly coupled to the tactile element, but in general less effective haptic effects are the result.

In many cases, the output of several types of haptic effects can be faint and muddy to the user, and haptic sensations having predominantly high frequencies may be more perceptible. One effective haptic sensations for the embodiments are a relatively high frequency "ringing" effect. An actuator designed to resonate at a certain ideal frequency may be used to present a wide spectrum of frequencies by amplitude modulation techniques. For example, a compelling 25 Hz square wave can be generated by modulating a 250 Hz natural frequency generated by a tuned resonant actuator such as a large piezoelectric ceramic resonator. Such modulation schemes may rely on the actuator being tuned to the environment it lives in and the object it must drive. Some type of vibration isolation system can be used in some embodiments to keep the haptic sensations confined to the tactile element as opposed to allowing the haptic sensations to dissipate off into sympathetic modes in other portions of the housing of the electronic device.

One embodiment of driving mechanism 140 can generate a carrier frequency near resonance to drive the actuator. Driving mechanism 140 can modulate the carrier frequency to create a variety of sensations with different characteristics magnitudes and frequency. In other embodiments, driving mechanism 140 can provide an initial oscillating carrier signal at or near the natural frequency fn and can modulate the carrier signal with an effect envelope, if applicable (e.g. shapes the amplitude to a desired configuration to provide a desired frequency or effect), and drive an amplifier with the modulated signal, which in turn can drive the piezoelectric transducer 150. A sine wave carrier signal, as opposed to square wave or other types, used in such an embodiment tends to produce quieter haptic effects in the described embodiment of FIG. 4, which is often more desirable.

Some exemplary implementations of the embodiments of the present invention will now be described.

Figure 5:
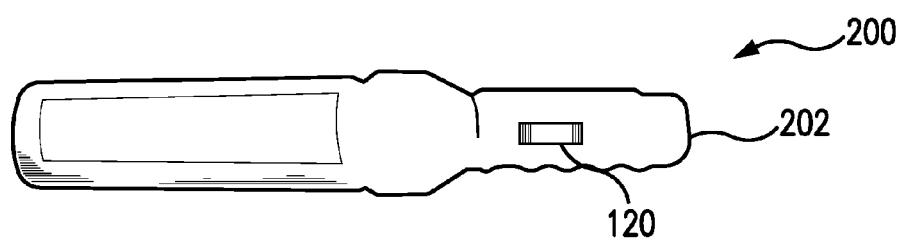
FIG. 5 illustrates an embodiment of the present invention in the form of a hand held metal detector having a tactile element.

FIG. 5 shows an example of a handheld metal detector 200 that is held by a user and moved over the object or area in which metal is to be detected. A tactile element 120 can be provided on the grip area 202 so that the user is in contact with tactile element 120 when gripping the metal detector device.

In one embodiment, metal detector 200 delivers status information to the user through haptic sensations transmitted to the tactile element. Typically, the haptic sensations are in the form of a silent vibration of the tactile element 120. By "silent" it is meant that the haptic sensations are unlikely to be sensed by another individual at a normal distance in a typical work environment).

As an example of use, embodiments of the invention can incorporate tactile element 120 within a grip of the hand-held metal detector used at security checkpoints. Current handheld metal detectors use audio-feedback to inform the operator if metal has been detected on the body of a target subject or provide a visible and audible vibration of the metal detector. The problem with conventional audio-feedback is that it alerts the target subject that metal has been detected. If that subject is trying to conceal a knife or gun, the subject knows that they have been detected and could immediately flee the scene. By replacing the audio cue with a discrete haptic cue to tactile element 120 delivered only to the fingers or palm that contact the tactile element on the metal detector operator, the status information can be conveyed without compromising the privacy of the information.

The haptic cue can be a vibration cue, signaling that metal has been detected. In some embodiments, the magnitude of the vibration can indicate the strength of the metallic detection signal. Alternatively, the frequency of the vibration haptic sensation that serves as the cue can indicate the strength of the metallic detection signal. In other embodiments, a combination of magnitude and frequency can be used in combination. Other embodiments can provide pulses or vibrations of different magnitudes to indicate a particular type of object or metal detected, if such functionality is provided by the metal detector device.

In addition to provide haptic cues for indicating metal, another status cue that can be reported to the user of metal detector or other hand-held security device 200 is a low-battery warning, indicating that the batteries powering the detector are running low on power. The tactile element 120 can signal a low battery through a vibration cue at a particular magnitude and frequency, or through a serious of cues (such as pulses) in a particular temporal arrangement. For example, a series of high frequency pulses at 2-second intervals could be used to alert the user of low-battery status.

In another embodiment, the electronic device that delivers status information to a user is a car alarm remote 300, When a user locks or unlocks their car through a remote keyless entry feature, a loud audible beep comes from the car to indicate that status of the alarm and/or the status of the locks on the doors. This signals to many people in the vicinity that the status of the car is locked or unlocked. In some situations, the user may not want others to know this status.

Figure 6:
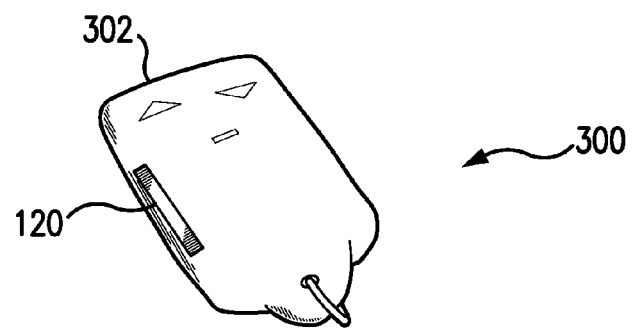
FIG. 6 illustrates an embodiment of the present invention in the form of a hand held keyless remote having a tactile element.

FIG. 6 shows an example of a remote control 300. The remote control allows the user to remotely lock or unlock the doors to a vehicle that receives the particular wireless electromagnetic signal from the remote control (e.g., radio signal, infrared signal, etc.). Typically a button or other control 302 on the remote control is pressed or activated by the user. As shown in FIG. 6, a tactile element 120 can be provided on a surface of the housing of the remote control to provide haptic sensations to the user's finger or palm that is holding the remote control and to indicate the status of the car alarm. For example, a confirming haptic pulse or vibration could be used as the cue. A different frequency or magnitude could be used to indicate the state (e.g., locked or unlocked) of the car. In some embodiments, no audio beep needs to be output by the car or the remote control, thus privately allowing the user to determine the locked or unlocked state of the vehicle. One type of haptic sensation can be output to indicate a locked status, while a different haptic sensation can be output to indicate an unlocked status. For example, vibrations of different frequencies and/or magnitudes can be used. Furthermore, in some embodiments, different types of haptic sensations can be output to indicate other status of the vehicle, such as whether the car is full, half empty, or close to empty of gasoline, the oil level of the vehicle, etc., when the user activates the remote control asking for such information. Any information that is visually or audibly output by the remote control can be provided as silent haptic sensations through the tactile element.

In yet another embodiment, the electronic device that delivers status information can be a barcode scanner 400 used in a warehouse, mail room, retail store, medical facility, or other similar facility wherein barcodes on objects are read for inventory information, price information, or the like. Currently, a barcode operator aims the hand-held barcode scanner 400 at a piece of merchandise or other object, in order to read the barcode that is on the object. Because the user needs confirmation that the barcode has been successfully read, an audible beep is typically used to inform the operator about such status. Since the cue is audible, operators sometimes get confused when working in close proximity of other operators using similar electronic devices. For example, in a retail setting wherein many cashiers are in close proximity, all using barcode scanners, the noise from other barcode scanners is often confusing for a cashier. This solution is also problematic in environments that are noisy where an operator cannot hear the audio cue well, for example in a noisy warehouse or factory floor where inventory is being checked or identified. Similarly, this may occur in a noisy mailroom where packages are being processed.

Figure 7:
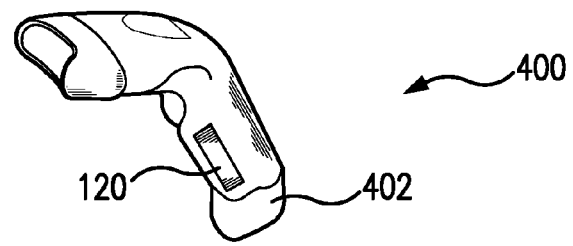
FIG. 7 illustrates an embodiment of the present invention in the form of a hand held bar code scanner having a tactile element.
Figure 8:
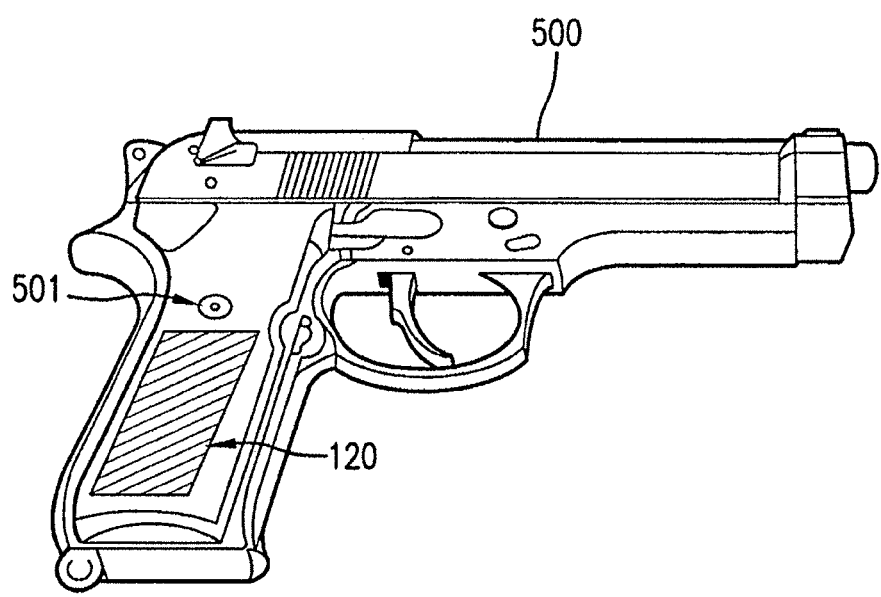
FIG. 8 illustrates an embodiment of the present invention in the form of a hand held gun having a tactile element.

The embodiments of the present invention can replace, or supplement, the audio cue with a silent haptic cue. FIG. 7 shows an example of a handheld barcode scanner 400 where the user grips a region of the barcode scanner (i.e., a hand grip 402) with his or her hand and moves the scanner sensing area at the opposite end of the device over a bar code pattern to sense the information in the bar code. As shown in FIG. 7, a tactile element 120 can be provided on the hand grip 402 to provide discrete haptic cues. A haptic cue, delivered to the finger or palm of the user of the barcode scanner, can be a short vibration, for example, that indicates the barcode has been successfully read.

Such a confirmation cue improves the operation of the barcode scanner, for often the operator may repeatedly trigger or activate the barcode scanner, trying to get a successful read. In some embodiments, different frequency and/or magnitude vibration signals can be used to convey a variety of status information. For example, a successful scan (e.g. where the barcode information is correctly read) can have a haptic cue that is different in magnitude and/or frequency from an haptic cue indicating an unsuccessful scan. Or an item on sale could be associated with a particular magnitude/frequency cue. For example, in an inventory environment, a particular haptic cue (magnitude and frequency profile) can alert the operator that a particular scanned item is "out of stock" or "low inventory." In a retail store environment, a particular tactile cue can alert the operator that a particular scanned item is discounted in price or "on sale." In a mailroom environment, a particular tactile cue could alert the operator that an item is "priority" or if an item is "late" or if an item is tagged "fragile" or "hazardous."

In another embodiment, the handheld (or otherwise user-contacted) electronic device can be a fingerprint scanner or retinal scanner, or ID card scanner, identifying a particular person as being authorized for access. The tactile element can be located in any convenient location that is contacted by the user—a handle, hand rest or armrest, etc. The cue identifying an unauthorized person can be a silent haptic sensation delivered to the operator, e.g., a particular magnitude or frequency of vibration providing the cue that a failed match or an authorized match was made.

In another embodiment, the electronic device that delivers status information is a weapon, such as a gun 500 or stun-gun. At the present time there is no convenient way for an operator of such a weapon to get status information without looking visually at the device. Often it is difficult, inconvenient or unsafe to look at a weapon to see if there is ammunition (or charge in the case of a stun gun), e.g., during a dangerous confrontation.

The present invention allows for the delivery of tactile status information without requiring the user to visually look at the weapon. A tactile element can be located on the front, side, or back of the handgrip of the gun, for example, similarly to the bar-code scanner described above. For example, the status information can be a series of pulses that indicate how much ammunition is left. Or, the status information can be a vibration, the magnitude or frequency of which indicates the amount of charge left in a stun gun. The status information can also convey cues relation to whether the "safety" catch on the gun is engaged or disengaged, disabling or allowing the gun to fire. Finally, for "smart weapons" that only work when held by a particular user, the tactile status information could include a cue that indicates the weapon has identified its appropriate user and is authorized to fire. This could be, for example, a confirmation that the fingerprint of the user has been correctly identified as belonging to the proper user of the weapon.

As can be appreciated, many other electronic devices can implement the embodiments of the haptic feedback assembly of the present invention. The above embodiments are merely examples and should not be construed to limit the scope of the present invention. For example, other electronic devices include, but are not limited to, cellular telephones, personal digital assistants (PDA), medical instruments, measuring tools, volt meters, current probes, connectivity probe, continuity probe, or the like. For example, a "digital level" could provide a tactile cue when the device is positioned at the 0" level or at a defined angle like 30" or 45" allowing a carpenter or machinist to gain knowledge about the level without an audible interruption or visual attention.

As another example, an electronic technician using a connectivity probe equipped with tactile feedback capability in the probe handle could gain tactile cues to indicate if two points in a circuit show connectivity. The frequency and/or magnitude of the cue could indicate the circuit resistance between the two points. Similarly, a voltmeter can be equipped with tactile cues to signal a 5V or ground with different frequency or amplitude tactile cues. Furthermore, a voltage level could be corresponded to a range of frequency and/or amplitude cues.

While this invention has been described in terms of several embodiments, it is contemplated that alterations, permutations and equivalents thereof will become apparent to those skilled in the art upon a reading of the specification and study of the drawings. For example, many of the features described in one embodiment can be used interchangeably with other embodiments. Furthermore, certain terminology has been used for the purposes of descriptive clarity, and not to limit the present invention.

That which is claimed is:
1. A handheld device comprising:
a user graspable housing comprising a user contactable region;
a tactile element coupled to the user contactable region;
a fingerprint sensor configured to detect a fingerprint and transmit a first signal associated with the fingerprint;
a sensor configured to detect data and transmit a second signal associated with the data, wherein the sensor comprises a magnetic detector;
a processor coupled to the fingerprint sensor and the sensor, the processor configured to:
receive the first signal from the fingerprint sensor;
receive the second signal from the sensor;
determine whether a user is a known user based in part on the first signal;
determine a haptic signal based in part on the first signal and the second signal; and
an actuator assembly positioned within the housing and coupled to the tactile element, the actuator assembly configured to receive the haptic signal and output a silent haptic sensation localized to the tactile element, the actuator assembly comprising a piezoelectric transducer, the piezoelectric transducer comprising a metal diaphragm, the metal diaphragm comprising an added mass configured to lower the natural frequency of the diaphragm.

2. The handheld device of claim 1, wherein the actuator outputs a force to the tactile element to laterally move the tactile element substantially along a plane of a contact surface of the tactile element.

3. The handheld device of claim 1, wherein the actuator outputs a force to the tactile element to move the tactile element substantially orthogonal to a contact surface of the tactile element.

4. The handheld device of claim 1, wherein the actuator is a solid state element.

5. The handheld device of claim 4, wherein the piezoelectric transducer comprises a piezoelectric ceramic transducer.

6. The handheld device of claim 1, further comprising a driving mechanism that is coupled to the actuator assembly to control a delivery of the haptic sensation.

7. The handheld device of claim 1, wherein the handheld device comprises a gun or a stun-gun.

8. The handheld device of claim 1, wherein the user contactable region of the housing is a handle or a grip.

9. The handheld device of claim 1, wherein the haptic sensation is a controlled pulse.

10. The handheld device of claim 1, wherein the haptic sensation is a periodic force sensation.

11. The handheld device of claim 10, wherein the periodic force sensation comprises a sine wave, a square wave, a saw-toothed-up wave, a saw-toothed down wave, or a triangle wave.

12. The handheld device of claim 1, further comprising a detector coupled to the tactile element that is configured to detect when a user is contacting the tactile element and transmit a third signal to the processor.

13. The handheld device of claim 12, wherein the processor is further configured to determine the haptic effect based in part on the third signal.

14. The handheld device of claim 1, wherein the fingerprint sensor comprises a user input device.

15. The handheld device of claim 1, wherein the haptic effect is a confirmation effect associated with an identification of the user.

16. The handheld device of claim 1, wherein the sensor comprises a sensor configured to detect a wireless electromagnetic signal.

17. The handheld device of claim 1, wherein the sensor comprises a bar code scanner.

18. The handheld device of claim 1, wherein the silent haptic sensation comprises a frequency of less than 500 Hz.

19. A handheld device comprising:
a user graspable housing comprising a user contactable region;
a tactile element coupled to the user contactable region;
a fingerprint sensor configured to detect a fingerprint and transmit a first signal associated with the fingerprint;
a sensor configured to detect data and transmit a second signal associated with the data, wherein the sensor comprises a bar code scanner;
a processor coupled to the fingerprint sensor and the sensor, the processor configured to:
receive the first signal from the fingerprint sensor;
receive the second signal from the sensor;
determine whether a user is a known user based in part on the first signal;
determine a haptic signal based in part on the first signal and the second signal; and
an actuator assembly positioned within the housing and coupled to the tactile element, the actuator assembly configured to receive the haptic signal and output a silent haptic sensation localized to the tactile element, the actuator assembly comprising a piezoelectric transducer, the piezoelectric transducer comprising a metal diaphragm, the metal diaphragm comprising an added mass configured to lower the natural frequency of the diaphragm.

* * * * *